United States Patent [19]

Fuchs et al.

[11] Patent Number: 5,082,368
[45] Date of Patent: Jan. 21, 1992

[54] HETERODYNE OPTICAL TIME DOMAIN REFLECTOMETER

[75] Inventors: Manfred H. Fuchs, Hamburg; Wolfgang Hoppe, Norderstedt; Friedrich-Karl Beckmann, Pinneberg; Ernst Brinkmeyer, Buchholz; Wolfgang Brennecke, Hamburg, all of Fed. Rep. of Germany

[73] Assignee: U.S. Philips Corp., New York, N.Y.

[21] Appl. No.: 599,253

[22] Filed: Oct. 3, 1990

Related U.S. Application Data

[63] Continuation of Ser. No. 265,364, Oct. 28, 1988, abandoned.

[30] Foreign Application Priority Data

Nov. 6, 1987 [DE] Fed. Rep. of Germany ....... 3737635

[51] Int. Cl.$^5$ ............................................. G01N 21/88
[52] U.S. Cl. ................................................... 356/73.1
[58] Field of Search ........................................ 356/73.1

[56] References Cited

U.S. PATENT DOCUMENTS 4,674,872 6/1987 Wright ............................... 356/73.1

FOREIGN PATENT DOCUMENTS 3506884 8/1986 Fed. Rep. of Germany ..... 356/73.1
62-266434 11/1987 Japan ................................... 356/73.1
2178554 2/1987 United Kingdom .

Primary Examiner—Vincent P. McGraw
Attorney, Agent, or Firm—William L. Botjer

[57] ABSTRACT

Heterodyne optical time domain reflectometer (OTDR) for determining the attenuation behavior of a monomode waveguide (test waveguide) by measurement of the backscattered parts of light pulses transmitted in said waveguide. An acousto-optic modulator (AOM) which deflects the transmission beam from a laser into the waveguide to be tested at a light frequency which is modulated with the acoustic frequency when the AOM is acoustically energized in a pulse mode. The light pulses backscattered from the test waveguide are superimposed on a local oscillator beam (LO) constituted by the laser beam which traverses the AOM when the AOM is not energized. The optical system losses are reduced in that the superposition is realized in a passive coupler, particularly a fibre coupler (10, 26).

23 Claims, 2 Drawing Sheets

HETERODYNE OPTICAL TIME DOMAIN REFLECTOMETER

CROSS-REFERENCES TO RELATED APPLICATIONS

This is a continuation of U.S. application Ser. No. 07/265,364 filed by Manfred H. Fuchs, Wolfgang Hoppe, Friedrich-Karl Beckmann, Ernst Brinkmeyer and Wolfgang Brennecke on Oct. 28, 1988, now abandoned.

BACKGROUND OF THE INVENTION

The invention relates to a heterodyne optical time domain reflectometer (OTDR) for determining the attenuation behaviour of a monomode waveguide (test waveguide) by measurement of the backscattered parts of light pulses transmitted in waveguide. An acousto-optic modulator (AOM) deflects the transmission beam from a laser into the waveguide to be tested at a light frequency which is modulated with the acoustic frequency when the AOM is acoustically energized in a pulse mode. The light pulses backscattered from the test waveguide are superimposed on a local oscillator beam (LO) constituted by the laser beam which traverses the AOM when the AOM is not energized.

The range of fibre-optic measuring systems for localizing faults in waveguides in accordance with the optical time domain reflectometer (OTDR) principle is limited due to the available laser pulse power and the receiver sensitivity. Particularly in the long-wave spectral range around 1300 nm which is used for bridging larger trajectories due to the low waveguide attenuation of approximately 0.5 dB/km, the range of the measuring systems is often too small because only small laser powers are available (several mW in the waveguide) and backscattering intensities are very low. The detection sensitivity is approximately −73 dBm at a bandwidth of 1 MHz (1 μsec pulse duration=100 m resolution in position).

The detection sensitivity can be considerably increased by employing the heterodyning technique. The limiting noise does not originate from the detector but from the signal to be detected and is approximately −97 dBm at the same data as mentioned above. The polarization dependence of the heterodyne reception generally causes a loss of 3 dB so that approximately −94 dBm can be considered as the minimum power to be detected. Since in the case of heterodyne reception the signal to be detected is mixed with a stable local oscillator level (LO beam), a continuously operating laser must be used in this method. Furthermore its line width must be clearly below the detection bandwidth (1 MHz) so as to prevent additional losses. In heterodyne reception, which has further advantages in noise behaviour, a constant frequency shift between the signal and the LO beam must be generated. In heterodyne reception only half the dynamic range in detector electronics is required as compared with a direct receiver because the receiver signal is proportional to the amplitude and not to the power of the optical backscattering signal.

For a further increase of the range of the reflectometer and for smoothing interference (fading) effects many successively measured signal curves can be averaged.

An arrangement of the type described in the opening paragraph is known from DE-OS 35 06 884. The LO beam and the backscattering signals are superimposed by means of a further AOM. However, since the available AOMs have a considerable transmission loss and since in addition considerable coupling losses occur due to the required bulk-optical connections in spite of the complicated and expensive adjustments, it is not possible to realize a heterodyne OTDR with a sufficiently large range by means of the known system. The system-dependent, theoretically possible gain in range of a heterodyne OTDR is eliminated by high attenuations of the single components.

SUMMARY OF THE INVENTION

Superposition is realized in a passive coupler, particularly a fibre coupler.

According to the invention a second AOM is not used. The passive coupler which is used instead of the AOM also results in inevitable losses but these are smaller than when using a second AOM.

According to a first embodiment the backscattering signals from the test waveguide are guided into a monomode waveguide leading to an opto-electronic transducer via the non-energized AOM followed by a low-attenuation direct path of an asymmetrical coupler and the LO beam is guided into said monomode waveguide via the cross-coupling path of said coupler.

In this arrangement the backscattering signals, on their path between the laser and the optical receiver, are passed twice via the AOM and then via the path of an asymmetrical coupler (for example a 13 dB fibre coupler), which path has a lower attenuation. Consequently this embodiment is particularly suitable if an AOM having a relatively low attenuation and having a transmission loss of, for example, less than 5 dB is available.

In a second embodiment the beam diffracted by the AOM is guided into the test waveguide via the low-attenuation direct path of an asymmetrical coupler. The backscattering signals are superimposed on the LO beam via the cross-coupling path of the coupler and the mixed signals are guided into a multimode waveguide leading to an opto-electronic transducer via the non-energized AOM.

As compared with the first embodiment the attenuations of the backscattering signal on the twofold path via the coupler are larger but in this arrangement one of the port connections which leads to the optical receiver is in the form of a multimode waveguide. It can be adjusted much simpler and more exactly so that substantially no coupling losses occur when coupling the beam into the multimode waveguide. Consequently the higher losses in the coupler are at least compensated for.

In a third embodiment with a three-port AOM the diffracted beam pulses are transmitted into the test waveguide via the direct path of a symmetrical coupler (3-dB coupler), and in that the LO beam, on which the backscattering signals are superimposed via the cross-coupling path of the coupler, is guided in the reverse direction, via the other direct path of the symmetrical coupler, into a monomode waveguide leading to an opto-electronic transducer. A modification of this embodiment is characterized in that the diffracted beam pulses are transmitted into the test waveguide via a cross-coupling path of a symmetrical coupler (3-dB coupler), and in that the LO beam is mixed in the reverse direction with the backscattering signals via a cross-coupling path of the coupler, said backscattering signals being guided on a direct path of the coupler into a monomode waveguide leading to an opto-electronic transducer.

This arrangement is particularly to be preferred when only an AOM having a relatively large transmission loss is available because the backscattering signal on its path between the laser and the optical receiver is only passed once through the AOM. As compared with the previously mentioned embodiments, a higher loss is caused in the 3 dB coupler.

For all system arrangements it holds that the attenuation of the LO beam is much less critical than that of the backscattering signal because its energy is relatively large anyway so that its attenuation hardly deteriorates the signal-to-noise ratio.

In addition to the inevitable material-dependent transmission losses, insertion losses are caused in an AOM multiport element, which losses are dependent on the value and the geometrical precision of the coupling of the optical beams. For a multiport element of the type described in the opening paragraph which has a low attenuation it is therefore essential to adjust the separate components carefully. Furthermore long paths through the air should be avoided because a small structural size of the multiport element is of course desirable and because radiation losses particularly due to beam expansion are caused on the transmission paths.

In a further advantageous embodiment of the invention the overall losses due to the AOM multiport system are very low in that the connections to the two ports of the AOM into which the LO beam and the transmission pulses leading to the test waveguide are guided comprise two parallel monomode waveguides whose end faces directed towards the AOM are arranged at least substantially equidistantly from the optical axis of the lens, which axis is disposed in line with the transmission axis of the AOM, in such a way that the axes of the beams between the end faces of the monomode waveguides and the lens extend parallel to the optical axis of the lens and that the beams between the lens and the AOM are inclined at the Bragg angle $\alpha$ relative to the optical axis of the lens and intersect one another substantially in the center of the AOM.

Whilst in known arrangements each waveguide arranged on one side of the AOM has its own lens, a single lense is arranged on either side of the AOM in this case. The waveguides, the lens and the AOM are arranged with respect to one another in such a way that the lenses not only serve for expansion and parallel focusing of the beams but also operate as deflection elements which deflect the beams through an angle equal to the Bragg angle with respect to the directions of the central axes of the beams emerging from the waveguides.

The optical axes of the lens and the transmission axis of the AOM are identical and a difference in angle does not have to be adjusted. The waveguides are arranged parallel to one another. A parallel position with a given spacing is much easier to realize than an exact angular arrangement of the waveguides.

The distance between the parallel waveguides may be very small, i.e. smaller than the threefold value of their external diameter, so that the lenses and the end faces of the waveguides are arranged very close to the AOM, whilst the bare claddings of the waveguides are preferably positioned substantially against one another.

If the distance between the central axes of the juxtaposed waveguides has at least approximately the value $d = f2$ ($f$ = focal length of the lense) the beam axes between the lens and the waveguide are parallel to the optical axis of the lens and between the lens and the AOM are inclined at the Bragg angle with respect to the direction of the acoustic wavefront guided through the AOM.

If the focal length f of the lens does not essentially exceed the value $w_{max}.\pi.w_o/\lambda$ ($w_o$ = field width in monomode waveguide, $\lambda$ = wavelength of the light, $2 w_{max}$ = diameter of the active aperture of the AOM) it is ensured that the beam diameters of the parallel beams traversing the AOM do not exceed the active aperture of the AOM.

It would be feasible to use a selfoc lens. However, selfoc lenses with focal lengths required for the invention are currently unavailable. However, the solution according to the invention could be eminently realized by means of planoconvex or biconvex lenses.

A bulk-optical arrangement is preferred in which the lens and the waveguides are secured to a supporting body in such a way that a relative adjustment of the distances in three perpendicular coordinate directions x, y and z is possible during the manufacture of the AOM multiport element. To minimize attenuations, an accurate adjustment is possible, which is in contrast to a version without air paths (for example, integrated optics).

Adjustment is facilitated in that the distances in the coordinate directions x, y and z can be selectively adjusted and fixed independent of one another and that means are provided which in the case of adjustment in one coordinate direction ensure that the adjusting positions in the other coordinate directions are maintained. An adjustment in the one coordinate direction can then not be varied during the adjusting process for the other coordinate directions.

Particularly in a four-port AOM element it is advantageous that the port connections of the AOM at the side where the laser beam is coupled in are also formed as defined hereinbefore.

When using lasers which react sensitively to backscattering reflexes (instability) it is advantageous that the transmission beam of the laser is passed via an optical isolator.

Since radiation reflected by an optical receiver (for example, photo diode) in the laser is considerably attenuated by the asymmetrical coupler in the previously mentioned two embodiments, the use of an optical isolator may be generally unnecessary in so far as disturbing reflections of other system components are sufficiently prevented.

Heterodyne reception is a polarization-sensitive detection method. For an optimum reception the polarizations of signal light and local oscillator light must correspond; the mixing product for polarizations which are perpendicular to one another becomes zero.

The backscattered light from each longitudinal element of a fibre has different, unpredictable and generally slowly varying states of polarization (SOP) as a function of time. Consequently, there is signal fading in the case of fixed local oscillator polarization. To prevent this, it is advantageous that the LO beam is guided via a polarization scrambler.

By means of two magnet arrangements which were rotated through 45° with respect to each other, alternating forces were exerted on a section of a monomode fibre. The magnets were operated with triangular currents of different frequencies (for example 17 and 21 Hz) and at such amplitudes that retardations from 0 to $2\pi$ were caused in the waveguide in the two directions. It was achieved that the fluctuation of the backscatter curves, to be expected due to polarization effects, can only be approximately 0.1 dB.

For a backscattering measuring device according to the invention a laser line width of 1 MHz is advantageous to meet the requirements with respect to bandwidth of the intermediate frequency spectrum obtained by superposition of the local oscillator and the frequency-shifted light. DFB lasers (DFB=distributed feedback) have been found to be advantageous for the invention in this respect. A very simple and very effective stabilization of the laser was achieved in that the laser beam is passed via the low-attenuation (particularly 1.5 dB) direct path of an asymmetrical coupler having its cross-coupling port connected to a section of a monomode waveguide with a reflective end face so that a small part of the transmission energy is fed back to the laser for the purpose of stabilization.

In one arrangement a single-mode four-port fibre coupler was spliced to a DFB laser with a single-mode fibre pigtail. One branch served as a coupling-out arm for the narrow-band laser light whereas the other arm was used as a stabilization branch. The external phase resonator is formed by the laser pigtail, the coupler with its fibre connections and the fibre end at which reflection occurs. The fibre section serves as an end "mirror" and with an adapted dimensioning of the coupler it ensures the line-width narrowing of the DFB laser and defines the resonator length. The degree of reflection of the section is approximately 2% (−17 dB) in practice because inevitable angle faults during cutting generally prevent the theoretical value of approximately 4% (−14 dB) from being reached. To obtain the optimum degree of reflection of approximately 0.02% (−37 dB) at the laser, a coupler with a coupling degree of 10% was chosen.

To suppress disturbing reflections from the coupling-out branch, this fibre end was polished at an angle of approximately 10°. The plane of polarization of the beam reflected in the laser was well maintained because short fibre pieces between the laser and the coupler and between the coupler and the exit were used. A laser line width of 100 KHz without essential losses of available output power was achieved.

Since transmission lasers of the conventional construction, particularly also DFB lasers may lose their narrowbandedness in case of reflections from a backscattering measuring device, it may be advantageous, even in addition to the use of an optical isolator, to take further measures for preventing reflections because, as is known, an isolator does not completely block reflections. Therefore, according to a preferred solution, the end faces of the waveguides constituting the port connections to the AOM are inclined relative to their axes at an angle which differs slightly, in particular by approximately $\beta = 6°$, from a right angle and the axes of the waveguides extend at such an angle, in particular $\delta = 2.7°$, to the lens axis that the axes of the beams emerging from the end faces of the waveguides extend parallel to the optical axis of the lens.

This measure is particularly recommendable if one of the previously mentioned embodiments of the invention, formed with a four-port AOM is to be used. In that case an isolator may not even be needed.

All measures for blocking Fresnel reflections in the transmission laser are of course unnecessary if a laser is used which of itself is already sufficiently insensitive to reflection without losing its stability and narrowbandedness.

DETAILED DESCRIPTION OF THE DRAWINGS

Figure 1:
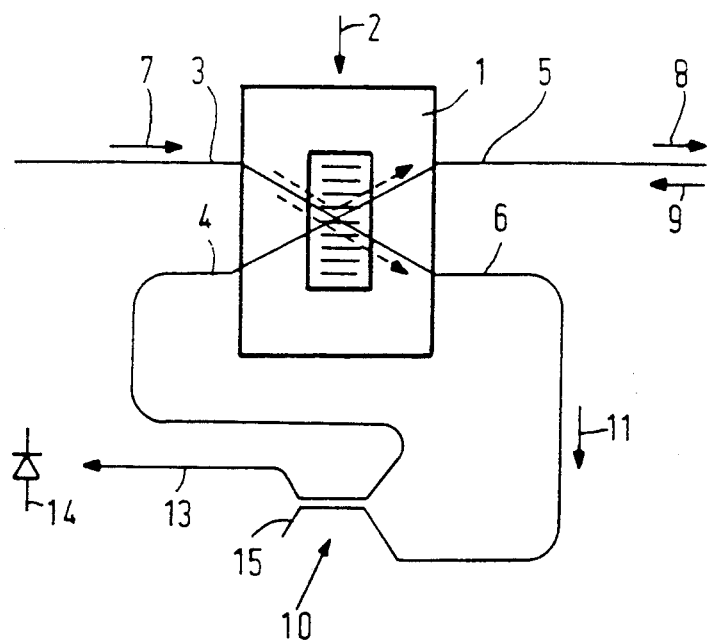
FIG. 1 shows diagrammatically the arrangement of the essential optical components for a first OTDR according to the invention.

FIG. 1 shows an acousto-optic modulator (AOM) 1 through which an acoustic wave can be passed in the direction of the arrow 2. Optical beams can be guided through the AOM 1 via monomode waveguides 3, 4, 5 and 6 constituting port connections and via lenses which are not shown. The laser transmission beam coming via the waveguide 3 in the direction of the arrow 7 is directly received as an LO beam in the waveguide 6 when the AOM 1 is not energized. When the AOM 1 is acoustically energized in a pulse mode, a frequency-shifted measuring pulse is transmitted to a test monomode waveguide in the direction of the arrow via the waveguide 5 which is connected to this test waveguide. The backscattered signals which return in the direction of the arrow 9 and have a time delay which depends on the scattering location, reach the waveguide 4 via the AOM 1 which is no longer acoustically energized and are superposed on the LO beam via an asymmetrical fibre coupler 10 (direction of the arrow 11). The mixed signal obtained is directed onto the optically sensitive surface area of a photodiode 14 via the monomode waveguide 13.

The coupler 10 is dimensioned in such a way that approximately 90% of the energy of the backscattered pulses (direction of the arrow 9) is transmitted via its direct path between waveguide 4 and waveguide 13. Only approximately 10% of the backscattered energy is lost due to coupling in to the non-used connection 15 of the coupler 10. Conversely, 10% of the LO energy is transmitted from the waveguide 11 to the waveguide 13.

Figure 3:
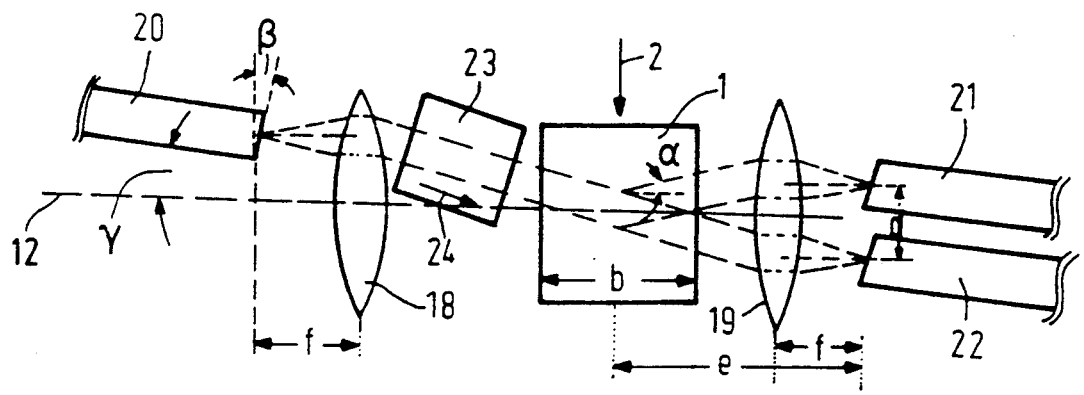
FIG. 3 shows the arrangement of the components of an AOM which is suitable for a third OTDR according to the invention.

Reflections which are backscattered from photodiode 14 to the waveguide 13 are also reduced to approximately 10% of their value by the coupler on their path in the waveguide 11 so that only a considerably attenuated part of reflections can reach the laser, which is not shown, via the AOM 1 and the waveguide 3. Therefore it is possible to leave out an optical isolator if measures described with reference to FIG. 3 are taken to reduce the reflections of the port connections of the AOM 1. The system arrangement according to FIG. 1 is advantageous if an AOM which has a very low attenuation is available.

Figure 2:
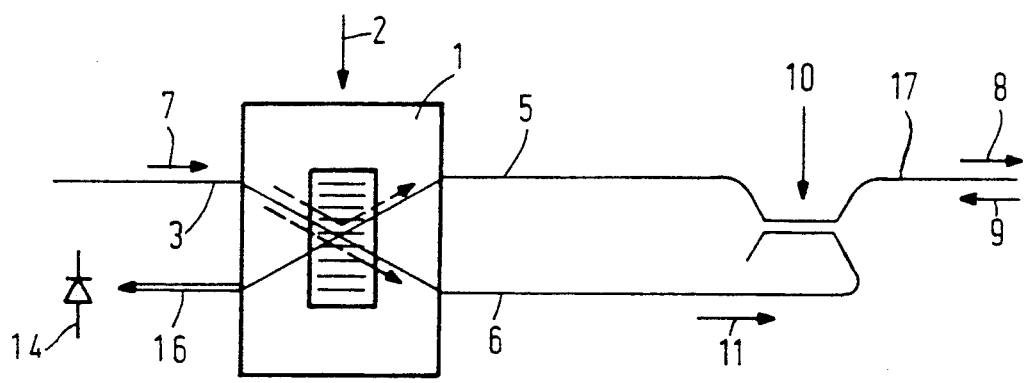
FIG. 2 shows diagrammatically the arrangement of the essential optical components for a second OTDR according to the invention.

In the construction of the system according to FIG. 2 the AOM 2 and the asymmetrical coupler 10 are associated with each other in a different way. Furthermore a multimode waveguide 16 replaces monomode waveguide 4 as a fourth port connection of the AOM 1.

The test waveguide is to be connected to the monomode waveguide 17. The backscattered signal coming in the direction of the arrow 9 reaches the multimode waveguide 16 and then the photodiode 14 via the direct low-attenuation path (90%) of the coupler 10 and the non-energized AOM 1. Approximately 10% of the LO-beam passed via the waveguide 6 in the direction of the arrow 11 is previously mixed in the coupler 10. As compared with the embodiment of FIG. 1 the coupler ensures a two-fold attenuation of the backscattered energy, because the transmission pulse and its part backscattered as a backscattered signal are attenuated by approximately 10%. On the other hand the alignment of the multimode waveguide 16 for maximal acceptance of the mixed signal from the AOM 1 is much simpler and more effective so that substantially no insertion losses are produced.

The solution according to FIG. 2 will be preferred if an AOM with a low transmission loss is available and a reduced number of adjusting components is aimed at. Also for this solution an optical isolator may be left out under favourable conditions, similarly as in the arrangement according to FIG. 1.

Figure 4:
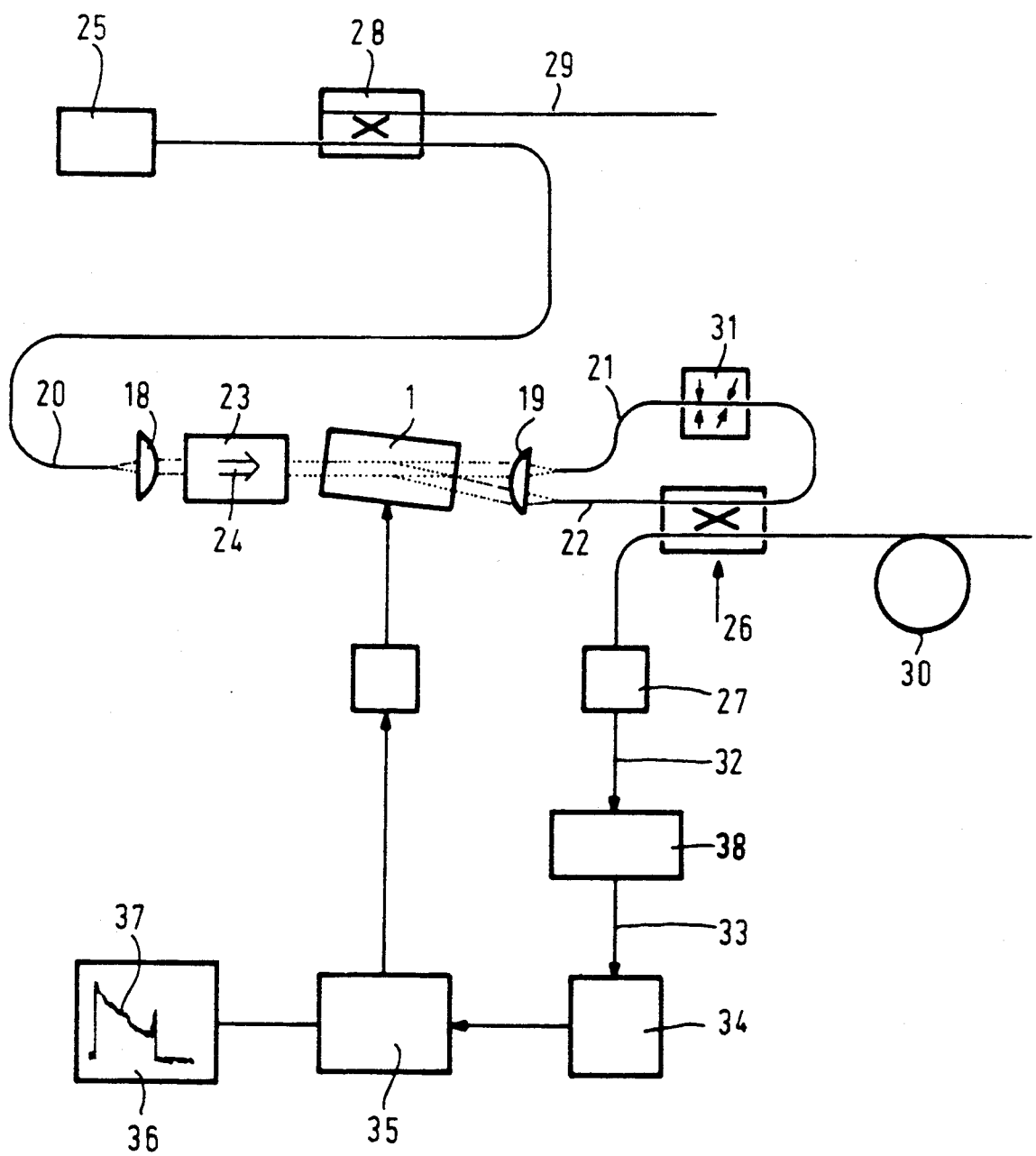
FIG. 4 shows diagrammatically the arrangement of the optical components and the associated electronic circuits for a third OTDR according to the invention.

FIG. 3 shows a low-attenuation, low-reflection, three-port AOM having a structure which can be simply adjusted and which is advantageously suitable for a system construction as shown in FIG. 4.

The three-port element system shown diagrammatically in FIG. 3 comprises AOM 1, lenses 18 and 19 of the same type and having the same focal length f and the monomode waveguides 20, 21 and 22 constituting port connections. The optical axes of the lenses 18 and 19 and the transmission axis of the AOM 1 coincide with the central axis 12. The longitudinal axes of the waveguides 20, 21 and 22 are arranged parallel to one another in a common plane which extends through the central axis 12 in the direction 2 of an acoustic wave which can be guided to the AOM 1.

The distance l between the centre of the AOM 1 and the end faces of the waveguides 21 and 22 should possibly have the value $l = 2f + (n-1) \cdot b/2n$ (n = refractive index of the AOM material, b = width of the AOM) but a very precise adjustment of this value is not required when the diameter of the active aperture of the AOM 1 is larger than the field width of the parallel widened beams extending between the lens 19 and the AOM 1, which beams intersect one another in the centre of the AOM and are directed towards the central axis 12 at the Bragg angle $\alpha$ shown exaggerated. Such a direction is obtained when the distance between the central axes of the waveguides 21 and 22 is at least substantially $d = f \cdot 2\alpha$.

The axes of the waveguides 20 to 22 are in a common plane which is given by the central axis 12 and the direction 2 of the acoustic wave. Since the optical isolator 23 is inserted between the lens 18 and AOM 1, the distance between the end face of the waveguide 20 and the centre of AOM 1 is larger than the value l. The end faces of the waveguides 21 and 22 are arranged at the same distance from the central axis 12. For the end face of the waveguide 20 a larger distance from the central axis 12 is obtained because of the longer beam path. This distance is shown exaggerated in FIG. 2. The Bragg angle $\alpha$ is actually much smaller. A distinction between the relative positions of the waveguides 22 and 20 can hardly be observed with the unaided eye.

Since the end faces of the waveguides 20 to 22 are bevelled by the angle $\beta = 6° \pm 30\%$, Fresnel reflections are substantially avoided without any noticeable additional insertion losses being caused. The oblique position of the axes of the waveguides 20 to 22 at the angle $\Gamma = 2.7° \pm 30\%$ with respect to the central axis 12 is required in order that the beams emerging from their end faces impinge on the lenses 18 and 19 along an axis which is parallel to the optical axis of the lens and to the central axis 12, respectively. This ensures that the parallel widened beams extend at the Bragg angle towards the centre of the AOM.

The isolator 23 is aligned in such a way that the plane of polarisation of the laser beam directed via the waveguide 20 is passed substantially unhindered in the direction of the arrow 24. Due to the non-reciprocal rotation of the plane of polarization of the light upon its passage through the isolator 23, substantially no reflected light can get back to the laser in the opposite direction. Since the light is only slightly attenuated on its paths through the three-port element according to FIG. 3, the range of the heterodyne OTDR equipped with this arrangement according to FIG. 4 was very large, i.e. also the attenuation behaviour of longitudinal sections of the test waveguide which were located at a large distance from each other could be measured in a reliable way.

The precise adjustment of the single components essentially contributed to this success. It was found that in an arrangement according to FIG. 3 a precision adjustment based on fractions of one $\mu$m was possible with simple constructive means and with relatively simple adjusting efforts.

Since the distance between the waveguides 21 and 22 can be chosen to be smaller than the three-fold value of the waveguide diameter, very short construction lengths for the AOM arrangement are the result. The AOMs 1 shown in a basic circuit diagram in FIGS. 1 and 2 were therefore constructed in a similar way as those in FIG. 3 but without an isolator 23.

The system according to FIG. 4 is an advantageous compromise when using available components (DFB laser, AOM). The AOM 1 with its port connections can be simply constructed and can be correctly adjusted for low loss. The light of the 1300-nm continuous wave laser 25 (Hitachi HL 1341 A; line width approximately 100 kHz, power approximately 1 mW) is stabilized by the monomode waveguide 29 which is reflecting via the coupler 28 back to the laser 25. The laser, even in the direct path, reaches the optical detector 27 in the LO branch through the AOM 1 and the 3 dB fibre coupler 26. The AOM 1 is used for generating the frequency-shifted light pulse in the fibre to be examined. It is controlled by means of a high frequency signal (frequency f = 80 MHz) during the pulse period. The moving sound wave thereby generated diffracts the laser light in the first order (Bragg angle) and simultaneously shifts it by the frequency f (Doppler effect). The light pulse reaches the test waveguide 30 through the four-port coupler 26. The backscattered signal (Rayleigh scattering) again traverses the coupler 26, mixes with the LO signal and finally reaches the detector 27. As compared with the connections to the symmetrical coupler 26 shown in FIG. 4, the connections on the right-hand side or on the left-hand side of the coupler can be exchanged without affecting the operation.

The three-port AOM 1 is used as a fast optical switch having a simultaneous frequency shift and provides the smallest possible optical losses with the four-port fibre coupler 26 because the light must pass the AOM 1 only once. The backscattered signal is attenuated by the symmetrical 3 dB coupler by only approximately $-3.5$ dB.

Furthermore the three-port AOM 1 shown in FIG. 3 permits use of an optical isolator 23 for suppressing system reflections which would affect the laser stability. To minimize reflections, bevelled waveguides 20 to 22 according to FIG. 3 were used. A compact AOM structure was realized which could relatively easily be adjusted, was insensitive to mechanical and thermal loads and had a small optical transmission loss (approximately −6 dB with the isolator). Approximately −10 dBm (100 μW) laser power is available at the entrance of the test fibre.

The small structure of the AOM system which essentially comprises the isolator 23, lenses 18 and 19 and exactly aligned waveguides 20 and 21 on either side of the AOM was much smaller as compared with conventional arrangement. The positions of the focal points at a small distance between AOM and lens were chosen to be such that they were only 125 μm apart at the focal length of 4 mm and the AOM deflection angle of 1.6°. The waveguides 21 and 22 (9 μm core diameter, 125 μm outer diameter) were directly positioned against each other. The focused laser beams were directed straight into the waveguide cores.

A polarization scrambler 31 with which polarization fading effects can be averaged out more quickly is arranged in the LO branch between the AOM and the coupler.

The optical signals superimposed on the local oscillator light are received from a conventional 100 MHz PINFET detector 27 with waveguide connection. To process the resultant electric signals 32, a filter tuned to the intermediate frequency of 80 MHz is employed at a bandwidth corresponding to the carrier frequency backscattering signal. Disturbing frequency components are thereby kept away from the subsequent amplifier stage so as to avoid possible intermodulation effects.

Subsequently the demodulation or rectification by means of a diode is carried out. This demodulator diode ("2nd detector") is operated by a corresponding bias current in the quadratic part of its characteristic curve. This results in both a high sensitivity and in an undistorted electrical reproduction of the optical backscattering signal over a wide dynamic range—if the IF signal amplitude is not too high, thus if the IF amplification is correctly adapted. This is effected in the circuit 38.

After a low-pass filtering at approximately 2 MHz angular frequency a voltage level 33 is available which is proportional to the backscattering power (envelope of the squared IF signal). It is scanned and digitally stored after each laser pulse by means of a 10-bit A/D converter 34 at an interval of 1 μsec (corresponding to 100m local resolution).

For further increasing the range of the reflectometer and for smoothing interference (fading) effects, many successively measured signal curves can be averaged. To this end a fast real time electronic averager was provided (in the circuit element 34). It permits of storing up to 4096 measuring values succeeding the laser pulse as a function of time. At the scanning interval of 1 μsec this corresponds to a maximum length of the fibre path of approximately 400 km. For the purpose of averaging, up to one million measurement results can be summed in real time whilst each of the 4096 separate measuring values in each memory location (channel) is added to the sum of the previous results. In the case of a measuring length of 50 km (500 channels of 100m each), the AOM can generate a frequency-shifted laser pulse every 500 μsec so that 2000 averaging operations can be performed per second, resulting in a total of one million separate measurements. The gain in the measurable one-way dynamic range of the reflectometer is obtained at 2.5 dB·log(m) (m=number of averaging operations). For example, at 10000 measuring cycli (5 sec of total measuring time at a length of 50 km) an improvement of 10 dB in the signal-to-noise ratio is obtained. The OTDR process control and the evaluation of the backscattering signals measured is carried out by means of a computer 35. The channel number for the electronic averager results from the selection of the maximum distance to be measured. The measuring results are graphically represented on the display screen 36 of the computer which adds the averaged data once more, whilst the number of possible averaging operations and hence the signal-to-noise ratio can be further increased. The number of measuring cycli to be performed by the electronic device results from the interval between two evaluations and the channel number. During evaluation and graphic representation of the last measurements the electronic device already performs the next averaging operations resulting in continuously improved measuring curves 37 which indicate the known characteristic variation and provide information about the attenuation behaviour and the quality of the test waveguide.

What is claimed is:

1. A heterodyne optical time domain reflectometer (OTDR) for determining the attenuation behaviour of a monomode waveguide by measurement of the backscattered parts of light pulses transmitted in said waveguide, comprising: an acousto-optic modulator (AOM) which deflects the transmission beam from a laser into the waveguide to be tested at a light frequency which is modulated with the acoustic frequency when the AOM is acoustically energized in a pulse mode, and a fibre coupler superimposing the light pulses backscattered from the test waveguide on a local oscillator beam (LO) constituted by the laser beam which traverses the AOM when the AOM is not energized.

2. An arrangement as claimed in claim 1, wherein the backscattering signals from the test waveguide are guided into a monomode waveguide leading to an optoelectronic transducer via the non-energized AOM to a low-attenuation direct path of said coupler, and the LO beam is guided into said monomode waveguide via the cross-coupling path of said coupler.

3. An arrangement as claimed in claim 1, wherein the beam diffracted by the AOM is guided into the test waveguide through the low-attenuation direct path of an asymmetrical coupler, and the backscattering signals are superimposed on the LO beam through the cross-coupling path of the coupler, and the mixed signals are guided into a multimode waveguide leading to an optoelectronic transducer via the non-energized AOM.

4. An arrangement as claimed in claim 1, wherein the diffracted beam pulses are transmitted into the test waveguide via the direct path of a symmetrical coupler, and the LO beam, on which the backscattering signals are superimposed through the cross-coupling path of the coupler, is guided in the reverse direction, via the other direct path of the symmetrical coupler, into a monomode waveguide connected to an opto-electronic transducer.

5. An arrangement as claimed in claim 1, wherein the diffracted beam pulses are transmitted into the test waveguide through a cross-coupling path of a symmetrical coupler, and the LO beam is mixed in the reverse direction with the backscattering signals via a cross-coupling path of the coupler, said backscattering signals being guided on a direct path of the coupler into a monomode waveguide leading to an opto-electronic transducer.

6. An arrangement as claim in claim 1, wherein the AOM includes ports having lenses and the connections to the two ports of the AOM into which the LO beam and the transmission pulses leading to the test waveguide are guided comprise two parallel monomode waveguides whose end faces are directed towards the AOM, at least substantially equidistantly from the optical axis of the lens of the port, which axis is disposed in line with the transmission axis of the AOM, the axes of the beams between the end faces of the monomode waveguides and the lens of the port extending parallel to the optical axis of the lens of the port and the beams between the lens of the port and the AOM are inclined at the Bragg angle $\alpha$ relative to the optical axis of the lens of the port and intersect one another substantially at the centre of the AOM.

7. An arrangement as claimed in claim 1, wherein the transmission beam of the laser passes through an optical isolator in front of said AOM.

8. An arrangement as claimed in claim 1, wherein the LO beam passes through a polarization scrambler.

9. An arrangement as claimed in claim 1, wherein the laser is a distributed feedback laser.

10. An arrangement as claimed in claim 1, wherein the laser beam passes through a low-attenuation direct path of an asymmetrical coupler having its cross-coupling port connected to a section of a monomode waveguide with a reflective end face so that a small part of the transmission energy is fed back to the laser for the purpose of stabilization.

11. An arrangement as claimed in claim 1, wherein the AOM includes ports and waveguides comprise the port connection thereto, the end faces of the waveguides constituting the port connections to the AOM are inclined relative to their axes at an angle which differs by approximately $\beta = 6°$, from a right angle, and the axes of the waveguides extend at such an angle, in particular $\delta = 2.7°$, to the lens axis that the axes of the beams emerging from the end faces of the waveguides extend parallel to the optical axis of the lens.

12. A heterodyne optical time domain reflectometer (OTDR) for determining the attenuation behavior of a monomode waveguide comprising:
an acousto-optical modulator for receiving on a first port a laser generated light beam, and supplying said laser beam to second and third output ports during first and second switching conditions, respectively, said second port being connected to a waveguide which is to be tested, and a fourth port which receives backscattered radiation from said waveguide during said second switching condition;
an asymmetrical coupler having first and second coupled paths, a first of said paths being connected to said third output port for receiving said laser beam during said second switching condition, and said second path being connected to said fourth port, said second path delivering a mixed signal comprising said backscattered signal and a local oscillator signal from said third port; and
a photodetector connected to said second path of said asymmetrical coupler for receiving said mixed signal.

13. An arrangement as claimed in claim 12, wherein the optical isolator is arranged between a lens and the AOM.

14. A heterodyne optical time domain reflectometer (OTDR) for determining the attenuation behavior of a monomode waveguide by measurement of the backscattered parts of light pulses carried by said waveguide comprising:
an acousto-optical coupler having a first port for receiving a laser beam, second and third ports for transmitting said laser beam during first and second switching states, respectively, of said acousto-optical coupler, and a fourth port for transmitting backscattered light pulses from said waveguide;
an asymmetrical coupler having first and second direct paths coupled to each other, said first path serially connecting said second port to said monomode waveguide, and said second path connected to said third port; and
a photodetector connected to said fourth port for receiving backscattered light pulses from said waveguide mixed with a local oscillator signal.

15. A heterodyne optical time domain reflectometer (OTDR) for determining the attenuation behavior of a monomode waveguide comprising:
a source of laser light;
a coupler having first and second coupled paths, said first path connected to said source of laser light, said second path connected to a waveguide for stabilizing said source of laser light;
an optical isolator connected to said first path for receiving light from said laser source;
an acousto-optical coupler connected to said isolator, having first and second output ports, said acousto-optical coupler being connected to receive a signal for frequency shifting said laser beam, and switching said light beam between said first and second output ports;
a four port coupler having first and second coupled paths, said first path being connected to said first and second output ports; and
detection means connected by said four port coupler second path to said monomode waveguide, whereby backscattered light from said monomode waveguide is directed to said detection means.

16. The heterodyne optical time domain reflectometer (OTDR) for determining the attenuation behavior of a monomode waveguide of claim 15 further comprising a polarization scrambler connected to one of said paths of said four port coupler.

17. The heterodyne optical time domain reflectometer (OTDR) of claim 15 wherein said detection means includes:
a photodetector connected to said four port coupler second path;
a filter for filtering a signal from said photodetector; and,
a diode biased to operate in its quadratic characteristic curve, connected to receive a signal from said filter producing a voltage proportional to the power of said backscattered light.

18. A heterodyne optical time domain reflectometer (OTDR) for determining the attenuation behavior of a waveguide, comprising:
an acousto-optic modulator (AOM) which, when acoustically energized, serves to diffractively deflect a light beam from an optical source into a waveguide to be tested; and means, including an asymmetric fiber coupler, capable of optical communication with said AOM, for interacting light pulses backscattered from the test waveguide with a local oscillator (LO) beam constituted by a light beam from the optical source which traverses the AOM when the AOM is not acoustically energized, said light beam diffracted by the AOM being guided into the test waveguide through a low-attenuation direct path of said asymmetric coupler and said backscattered light pulses being interacted with said LO beam via a cross-coupling path of said asymmetric coupler, the resulting mixed signals being guided into a multimode waveguide leading to an opto-electronic transducer via the non-energized AOM.

19. A heterodyne optical time domain reflectometer (OTDR) for determining the attenuation behavior of a waveguide, comprising:

an acousto-optic modulator (AOM) which, when acoustically energized, serves to diffractively deflect a light beam from an optical source into a waveguide to be tested; and means, including a symmetric fiber coupler, capable of optical communication with said AOM, for interacting light pulses backscattered from the test waveguide with a local oscillator (LO) beam constituted by a light beam from the optical source which traverses the AOM when the AOM is not acoustically energized, said light beam diffractively deflected by the AOM being transmitted into the test waveguide via a first direct path of said symmetric coupler and the LO beam being guided through said symmetric coupler via a second direct path of said symmetric coupler, said LO beam being interacted with said backscattered light pulses via a cross-coupling path of said symmetric coupler, the resulting mixed signals being guided via a monomode waveguide to an opto-electronic transducer.

20. A heterodyne optical time domain reflectometer (OTDR) for determining the attenuation behavior of a waveguide, comprising:

an acousto-optic modulator (AOM) which, when acoustically energized, serves to diffractively deflect a light beam from an optical source into a waveguide to be tested; and means, including a symmetric fiber coupler, capable of optical communication with said AOM, for interacting light pulses backscattered from the test waveguide with a local oscillator (LO) beam constituted by a light beam from the optical source which traverses the AOM when the AOM is not acoustically energized, said light beam diffractively deflected by the AOM being transmitted to the test waveguide via a first cross-coupling path of said symmetric coupler and said LO beam being interacted with said backscattered light pulses via a second cross-coupling path of said symmetric coupler, the resulting mixed signals being guided via a monomode waveguide to an opto-electronic transducer.

21. A heterodyne optical time domain reflectometer (OTDR) for determining the attenuation behavior of a waveguide, comprising:

an acousto-optic modulator (AOM) which, when acoustically energized, serves to diffractively deflect a light beam from an optical source into a waveguide to be tested;

means, including a fiber coupler, capable of optical communication with said AOM, for interacting light pulses backscattered from the test waveguide with a local oscillator (LO) beam constituted by a light beam from the optical source which traverses the AOM when the AOM is not acoustically energized;

a lens, positioned adjacent an output end of said AOM and first and second substantially parallel, monomode waveguides, capable of optical communication with said lens, which serve to guide, respectively, said LO beam and said diffractively deflected light beam, said first and second waveguides being substantially equidistant from an optical ax of said lens, said optical axis being substantially co-linear with a transmission axis of said AOM, said LO and diffractively deflected light beams having axes which, between said lens and said first and second waveguides are substantially parallel to, and between said AOM and said lens are inclined at the Bragg angle relative to, said optical axis of said lens and intersect one another substantially at the center of the AOM.

22. A heterodyne optical time domain reflectometer (OTDR) for determining the attenuation behavior of a waveguide, comprising:

an acousto-optic modulator (AOM) which, when acoustically energized, serves to diffractively deflect a light beam from an optical source into a waveguide to be tested;

means, including a fiber coupler, capable of optical communication with said AOM, for interacting light pulses backscattered from the test waveguide with a local oscillator (LO) beam constituted by a light beam from the optical source which traverses the AOM when the AOM is not acoustically energized; and a polarization scrambler through which said LO beam is passed.

23. A heterodyne optical time domain reflectometer (OTDR) for determining the attenuation behavior of a waveguide, comprising:

an acousto-optic modulator (AOM) which, when acoustically energized, serves to diffractively deflect a light beam from a laser into a waveguide to be tested;

means, including a fiber coupler, capable of optical communication with said AOM, for interacting light pulses backscattered from the test waveguide with a local oscillator (LO) beam constituted by a light beam from the optical source which traverses the AOM when the AOM is not acoustically energized; and an asymmetric coupler capable of optical communication with said laser, said asymmetric coupler including a cross-coupling port in optical communication with a monomode waveguide having a reflective end face, whereby a portion of the light produced by said laser is fed back to the laser for the purpose of stabilization.

* * * * *